(12) United States Patent
Duisenberg et al.

(10) Patent No.: US 7,333,498 B2
(45) Date of Patent: Feb. 19, 2008

(54) METHOD AND APPARATUS FOR SEPARATING DATA PACKETS IN A MEMORY BUFFER

(75) Inventors: Kenneth C. Duisenberg, Roseville, CA (US); Rajeev Grover, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1000 days.

(21) Appl. No.: 10/147,004

(22) Filed: May 15, 2002

(65) Prior Publication Data

US 2003/0214973 A1 Nov. 20, 2003

(51) Int. Cl.
H04L 12/54 (2006.01)
(52) U.S. Cl. .................................. 370/395.71; 370/412
(58) Field of Classification Search ................. 370/465, 370/355, 392, 471, 466–467
See application file for complete search history.

(56) References Cited

U.S. PATENT DOCUMENTS

| | | | | |
|---|---|---|---|---|
| 5,475,754 A | * | 12/1995 | Bridgewater et al. | 380/212 |
| 5,557,609 A | * | 9/1996 | Shobatake et al. | 370/395.71 |
| 6,041,397 A | * | 3/2000 | Rickard et al. | 711/209 |
| 6,233,244 B1 | * | 5/2001 | Runaldue et al. | 370/412 |
| 6,363,428 B1 | | 3/2002 | Chou et al. | |
| 6,515,963 B1 | * | 2/2003 | Bechtolsheim et al. | 370/229 |
| 6,829,217 B1 | * | 12/2004 | Bechtolsheim et al. | 370/229 |
| 7,215,641 B1 | * | 5/2007 | Bechtolsheim et al. | 370/235 |
| 2002/0176430 A1 | * | 11/2002 | Sangha et al. | 370/412 |
| 2003/0039248 A1 | * | 2/2003 | Weaver | 370/392 |
| 2003/0088700 A1 | * | 5/2003 | Aiken | 709/245 |

FOREIGN PATENT DOCUMENTS

| | | | |
|---|---|---|---|
| EP | 1115252 A2 | * | 7/2001 |
| WO | WO99/66680 | * | 12/1999 |
| WO | WO00/56013 | * | 9/2000 |

OTHER PUBLICATIONS

Yuh-Ming Huang; Sheng-Uei Guan (A refined cut-through buffer management scheme for layered protocol stacks☐☐Communications Magazine, IEEE vol. 32, Issue 3, Mar. 1994 pp. 82-85) ☐☐.*

Asgari, A.; Ahmad, R.; Halsall, F. (Buffer management in connectionless servers for AAL5 traffic☐☐Twelfth UK Teletraffic Symposium. Performance Engineering in Telecommunications Networks (Digest No. 1995/054), IEE☐☐Mar. 15-17, 1995 pp. 13/1-1310)☐☐.*

* cited by examiner

Primary Examiner—Hassan Kizou
Assistant Examiner—Salman Ahmed

(57) ABSTRACT

Method and apparatus of separating packets. Specifically, a method of separating data packets in a memory buffer is disclosed. The method locates a memory buffer containing a pre-selected address at a buffer header of the memory buffer. A first data packet containing the buffer header is separated from a remaining part of the memory buffer. The first data packet is associated with a first packet length. The method then searches the remaining part of the memory buffer to locate a plurality of packet headers associated with a plurality of concatenated data packets. Each of the plurality of packet headers contains the pre-selected address. The method then separates the plurality of concatenated data packets, that is associated with a plurality of concatenated packet lengths, for processing.

28 Claims, 9 Drawing Sheets

METHOD AND APPARATUS FOR SEPARATING DATA PACKETS IN A MEMORY BUFFER

TECHNICAL FIELD

The various embodiments of the present invention relate to a method of and apparatus for separating multiple data packets concatenated and contained within a single memory buffer.

BACKGROUND ART

Hardware for a local area network (LAN) service processor manages access to the physical LAN network on a particular electronic device. A corresponding LAN software driver works in conjunction with the LAN hardware driver to process the data stored in memory by the LAN hardware driver.

Both the LAN hardware driver and the LAN software driver have synchronized buffer indices that indicate which memory buffer in a ring of buffer memories the corresponding hardware or software will access. With normal data processing when the buffer indices are synchronized, the LAN software driver would receive an interrupt from the LAN hardware driver that a new LAN data packet was received and ready for processing. The LAN software driver would check its buffer index and find the new data to process.

Normally, LAN packets of data received by the LAN hardware driver for processing are stored into available buffer memories in a one-to-one relationship, e.g., one memory buffer will contain one LAN data packet. As such, a memory buffer contains approximately 1600 bytes to accommodate for LAN data packets that are standardized to a maximum size of 1500 bytes. An extra 100 bytes are available for overhead to provide for alignment and memory, etc.

However, the LAN hardware driver will occasionally and incorrectly store separate data packets into the same memory buffer, possibly separated by any number of 4-byte values. The multiple LAN data packets overwrite pointers in the buffer memory. For example, due to timing differences amongst various buses and overloading from too many incoming LAN data packets, the LAN hardware driver will occasionally miss the end-of-packet marker. As a result, a single memory buffer could contain multiple LAN data packets. The multiple LAN packets are concatenated into a single memory buffer and are each complete for processing. In addition, the concatenated LAN data packets may not necessarily immediately follow the previous LAN data packet. Concatenation is used within the context of a LAN data packet located in an incorrect location, other than the beginning, in the memory buffer.

When the LAN hardware driver misses the end-of-packet marker, the LAN hardware driver will continue to store bytes into the Direct Access Memory (DMA) buffer memories. The LAN hardware driver stores the first 4 bytes for every LAN packet received from the LAN network until the LAN hardware driver receives a second LAN data packet that is either a Media Access Control (MAC) broadcast packet or a packet directed to the MAC address of the LAN hardware driver. When the end-of-packet marker for the second LAN data packet is not overridden by other concatenated LAN data packets, the LAN hardware driver is signaled that the associated memory buffer is ready for processing.

Prior Art FIG. 1 illustrates a memory buffer 100 containing multiple LAN data packets that are concatenated. Buffer memory 100 contains LAN data packets 510, 530 and 535. Concatenated LAN data packets may or may not immediately follow other LAN data packets. In addition, any number of LAN data packets may be concatenated. For example, noise data 540 is stored in 4 byte increments and contains the first 4 bytes of every LAN packet received from the LAN network between LAN data packet 510 and LAN data packet 530. However, LAN data packet 530 is immediately followed by LAN data packet 535. As a result, the three LAN data packets are concatenated within the memory buffer 100.

The LAN data packet 535 has an end-of-packet marker that has not been overwritten and that has been acknowledged by the LAN hardware driver. As a result, other LAN data packets are not concatenated within the memory buffer 100.

Unfortunately, when the buffer memory containing multiple LAN data packets that are concatenated is processed, only the first LAN data packet at the beginning of the memory buffer is processed. The remaining concatenated LAN data packets are ignored and lost. Not only does this lead to lost data, but the LAN hardware driver may crash, especially when the LAN hardware driver is overloaded with too many incoming LAN data packets.

DISCLOSURE OF THE INVENTION

Various embodiments of the present invention describe a method and apparatus of separating data packets. Specifically, a method of separating multiple data packets in a memory buffer is disclosed. The method locates a pre-selected address at a buffer header of the memory buffer. A first data packet containing the buffer header is separated from a remaining part of the memory buffer. The first data packet is associated with a first packet length. The method then searches the remaining part of the memory buffer to locate a plurality of packet headers associated with a plurality of concatenated data packets. Each of the plurality of packet headers contains the pre-selected address. The method then separates the plurality of concatenated data packets, that is associated with a plurality of concatenated packet lengths, for processing.

BRIEF DESCRIPTION OF THE DRAWINGS

The above and other objects and advantages of the present invention will be more readily appreciated from the following detailed description when read in conjunction with the accompanying drawings, wherein.

PRIOR ART

Figure 1:
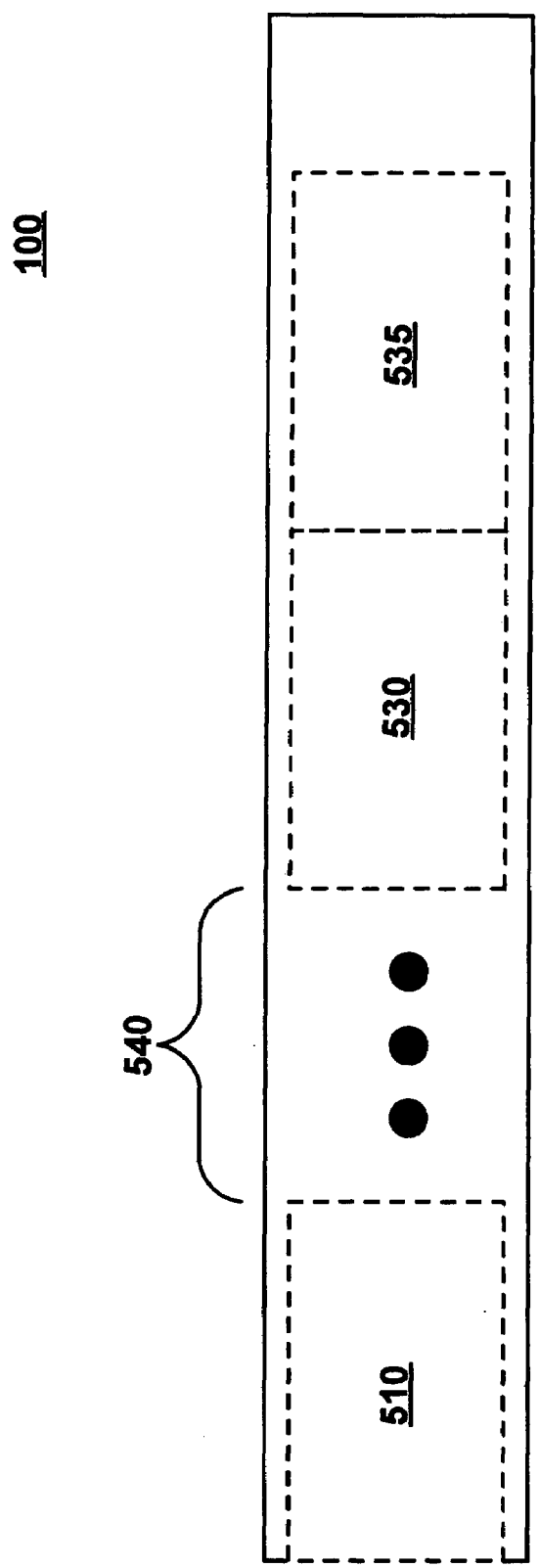
FIG. 1 is a diagram illustrating a memory buffer containing multiple LAN data packets that are concatenated.

The drawings referred to in this description should be understood as not being drawn to scale except if specifically noted.

BEST MODES FOR CARRYING OUT THE INVENTION

Reference will now be made in detail to embodiments of the present invention, a method for separating concatenated LAN data packets contained within a single memory buffer, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "separating," or "locating," or "searching," or "processing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Separating Multiple LAN Data Packets in a Memory Buffer

Accordingly, the present invention provides a method and system for separating multiple LAN data packets that are concatenated and contained within a single memory buffer. The present invention prevents the loss of data from concatenated LAN data packets contained within a memory buffer and provides for efficient processing of LAN data packets in an overloaded system as there are no lost data packets.

Figure 2:
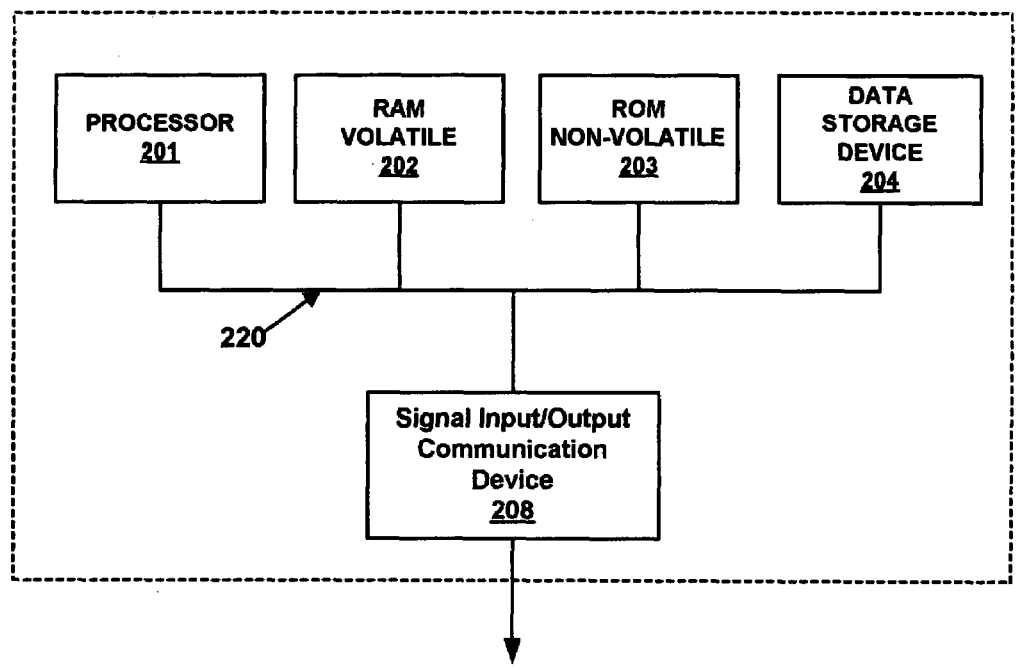
FIG. 2 is a logical block diagram of an exemplary LAN service processor that is capable of synchronizing LAN software and hardware buffer indices, in accordance with one embodiment of the present invention.

Referring to FIG. 2, embodiments of the present invention are comprised of computer-readable and computer-executable instructions which reside, for example, in computer-readable media of a computer system that is coupled to a LAN communication network. FIG. 2 is a block diagram of exemplary embedded components upon which embodiments of the present invention may be implemented. Exemplary computer system 200 includes an internal address/data bus 220 for communicating information, a central processor 201 coupled with the bus 220 for processing information and instructions, a volatile memory 202 (e.g., random access memory (RAM) static RAM, dynamic RAM, etc.) coupled with the bus. 220 for storing information and instructions for the central processor 201, and a non-volatile memory 203 (e.g., read only memory (ROM), programmable ROM, flash memory, EPROM, EEPROM, etc.) coupled to the bus 220 for storing static information and instructions for the processor 201.

With reference still to FIG. 2, an optional signal Input/Output (I/O) device 208 is shown. The I/O device 208 is coupled to bus 220 for providing a communication link between the computer system 200 and other electronic devices, such as through a local area network (LAN). As such, signal I/O device 208 enables the central processor unit 201 to communicate with or monitor other electronic systems that are coupled to the computer system 200.

Embodiments of the present invention are discussed within the context of a LAN, LAN buffers, and LAN software and hardware drivers. However, it is appreciated that other embodiments of the present invention are well suited to buffers containing data in other communication networks, with other corresponding software and hardware drivers.

Figure 3:
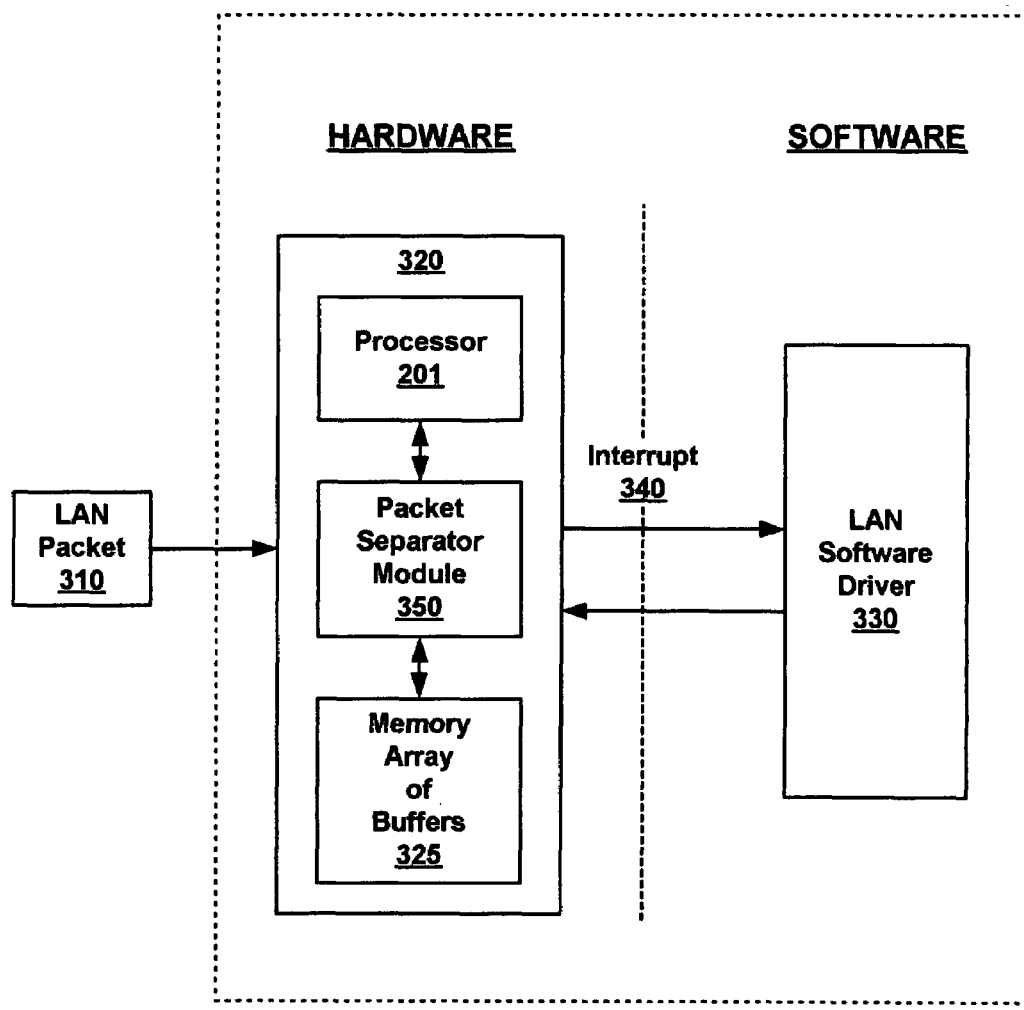
FIG. 3 is a data flow diagram illustrating the interfacing between a LAN hardware and LAN software driver, in accordance with one embodiment of the present invention.

Referring now to FIG. 3, a block diagram of the interface between a LAN hardware service processor 310 (e.g., a LAN hardware driver) and a corresponding LAN software driver 330 is generally shown, in accordance with one embodiment of the present invention. The LAN hardware service processor 320 and the LAN software driver 330 can be located on a computer system 200 of FIG. 2. The LAN hardware driver 320 is comprised partly of processor 201 and a memory array of buffers 325 that is directly accessible both by resources in the LAN hardware driver 320 and the LAN software driver 330. In one embodiment the memory array of buffers 325 is a Direct Memory Access (DMA) memory array.

The LAN hardware 320 manages access to the physical LAN network, in accordance with one embodiment. The corresponding LAN software driver 330 works in conjunction with the LAN hardware driver 320 to process the data stored in the memory array of buffers 325 by the LAN hardware driver 320.

In addition, the LAN hardware driver 320 is comprised of a packet separator module 350 that works in conjunction with the processor 201 and the memory array of buffers 325. The packet separator module 340 provides for separation of concatenated LAN data packets contained within a single memory buffer before the LAN hardware driver sends an interrupt signal 340 to the LAN software driver that a new LAN data packet 310 was received, stored in a memory buffer, and ready for processing.

Figure 4:
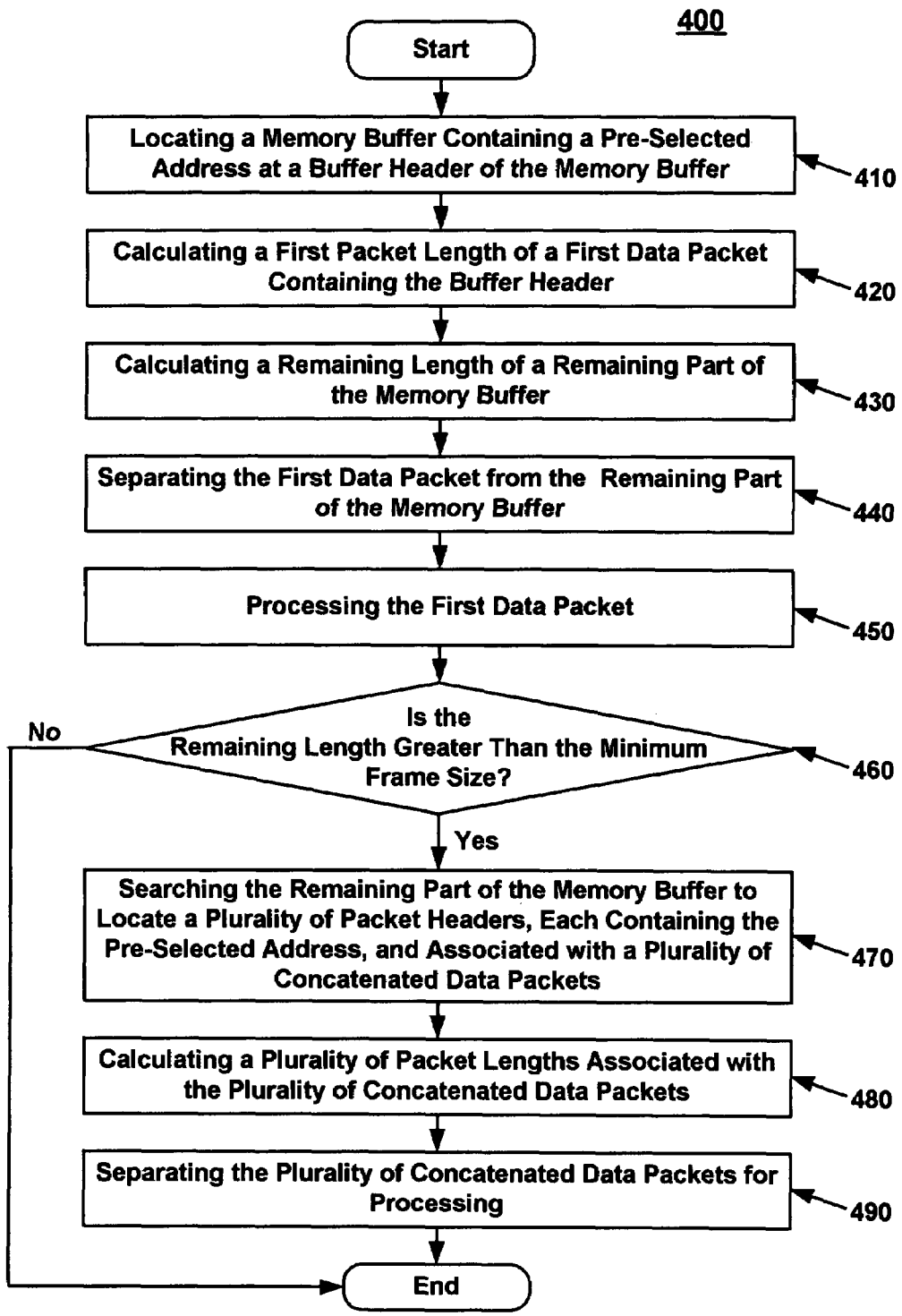
FIG. 4 is a flow diagram illustrating steps in a method of separating multiple LAN data packets in a memory buffer, in accordance with one embodiment of the present invention.
Figure 5A:
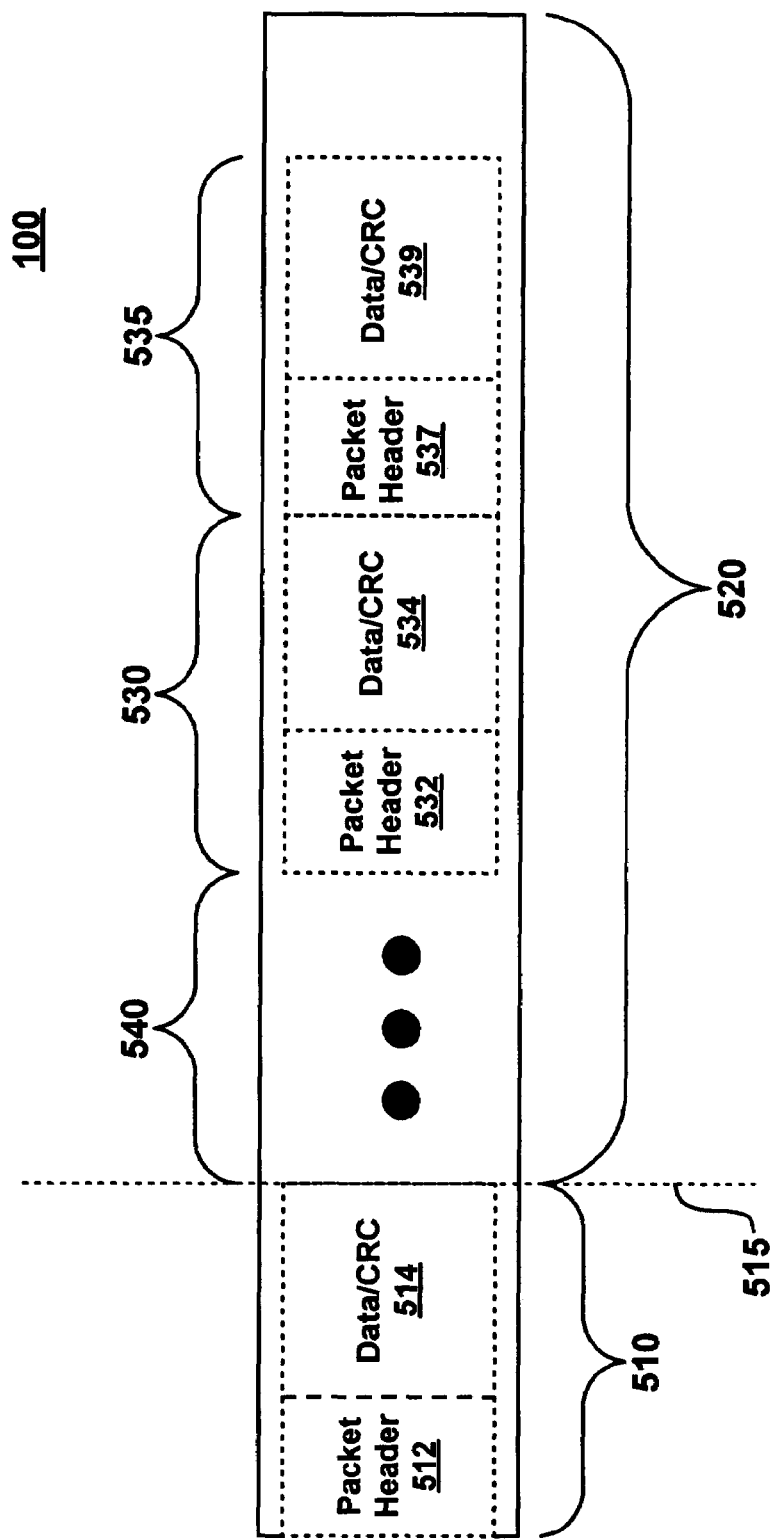
FIG. 5A is a block diagram illustrating a memory buffer separated into a first LAN data packet and a remaining part of the memory buffer that is searched for concatenated LAN data packets, in accordance with one embodiment of the present invention.
Figure 5B:
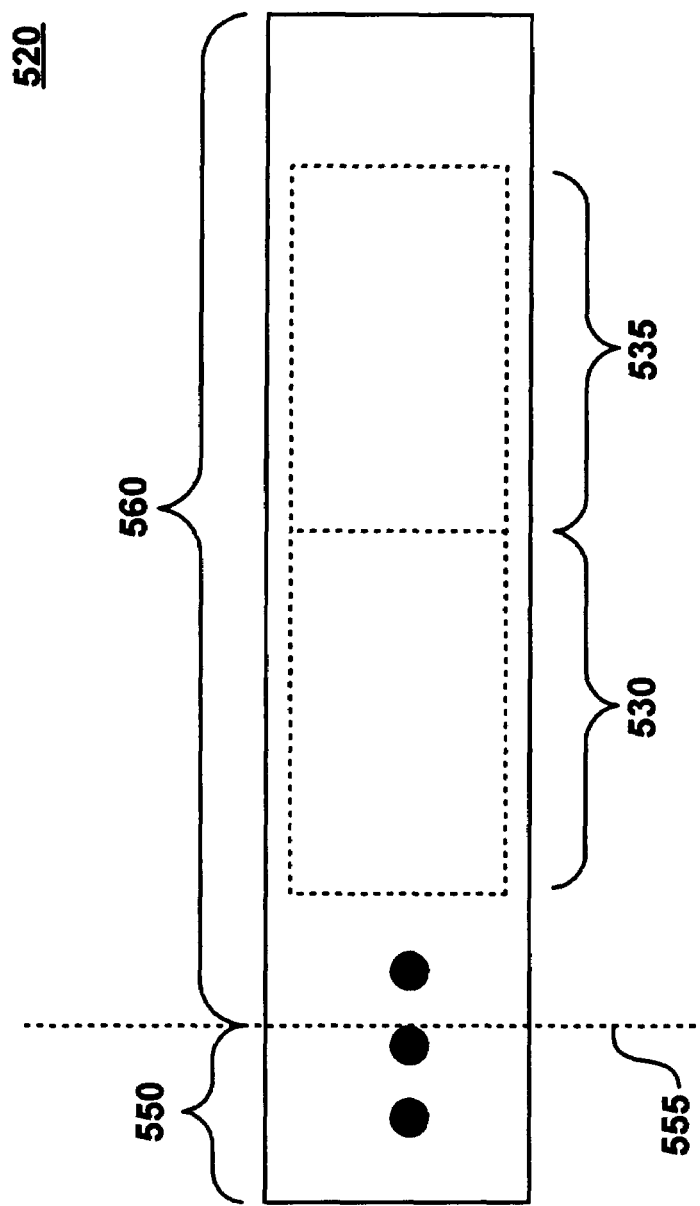
FIG. 5B is a block diagram illustrating a remaining part of the memory buffer of FIG. 5A that is searched for concatenated LAN data packets, in accordance with one embodiment of he present invention.
Figure 5C:
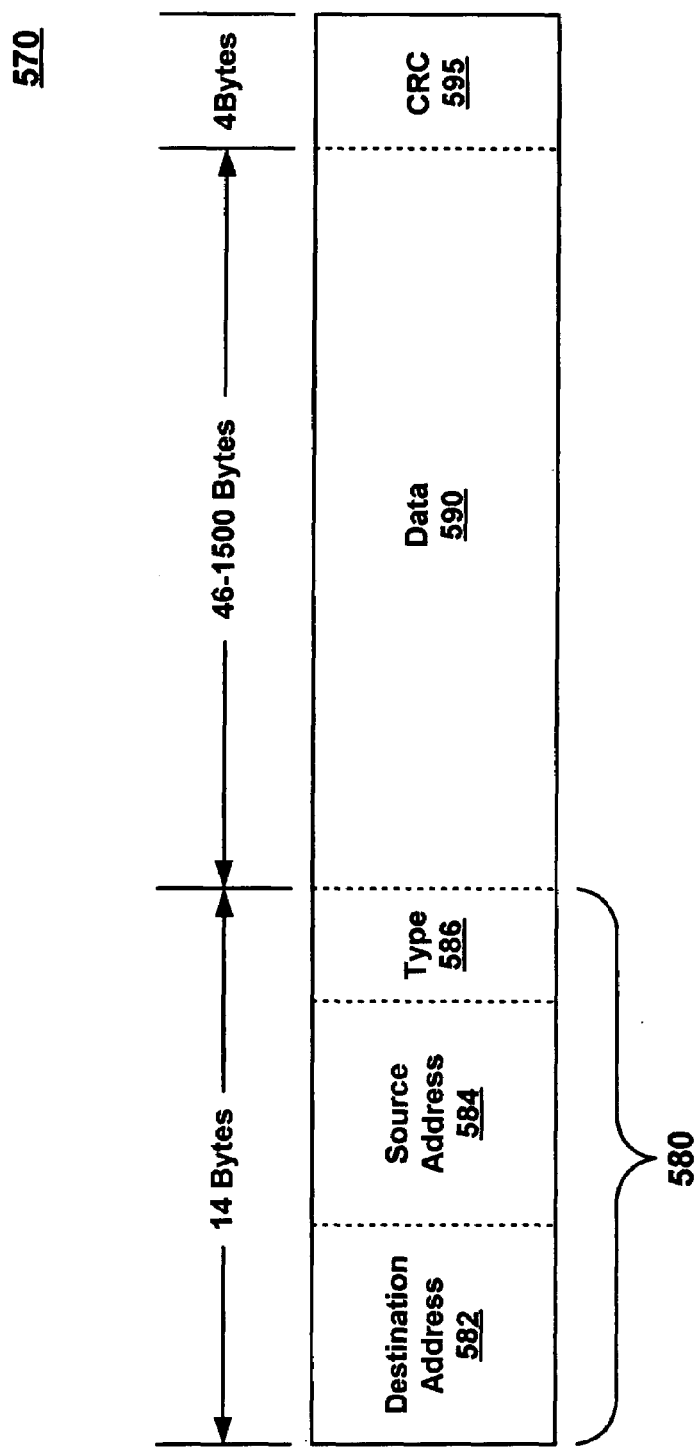
FIG. 5C is an exemplary LAN data packet that may be concatenated with other LAN data packets in a memory buffer, in accordance with one embodiment of he present invention.

FIG. 4 in combination with FIGS. 5A and 5C illustrate a method of separating packets. FIG. 4 is a flow chart 400 illustrating steps in a method for separating multiple LAN data packets that are concatenated and contained within a single memory buffer, in accordance with one embodiment of the present invention. The present embodiment begins by locating a memory buffer containing a pre-selected address at a buffer header of the memory buffer, in step 410. The memory buffer contains at least one LAN data packet that is ready for processing, and possibly could contain multiple LAN data packets that are concatenated within the memory buffer.

In one embodiment, the pre-selected address is a Media Access Control (MAC) broadcast 6 byte address of the following hexadecimal format: FF-FF-FF-FF-FF-FF. In another embodiment, the pre-selected address is a MAC 6 byte address of the LAN hardware driver. In still another embodiment the present embodiment assumes that the first byte of the memory buffer is also the beginning of the LAN data packet for simplicity.

Referring now to FIG. 5C, a block diagram of an exemplary LAN data packet 570 is shown, in accordance with one embodiment of the present invention. The LAN data packet 570 contains a packet header 580 that contains a total of 14 bytes. The packet header 580 includes a 6-byte destination address 582, a 6-byte source address 584, and a 2-byte type field 586, which identifies the type of protocol being carried by the LAN data packet 570. In the present embodiment, the 6-byte destination address 582 is either the MAC broadcast address or the MAC address of the LAN hardware driver.

Exemplary LAN data packet 570 also contains data (590) of 46 to 1500 bytes. In addition, the LAN data packet 570 also includes a 4-byte Cyclic Redundancy Check (CRC) after the data 590 for error detection. Any frame with an invalid CRC is discarded without further processing. As shown, with a minimum of 46 bytes of data, a minimum frame size for the LAN data packet 570 that includes a header 580 and the CRC 595 is 64 bytes, in accordance with one embodiment of the present invention.

Returning now to flow chart 400, in step 420, the present embodiment proceeds by calculating a first packet length of a first LAN data packet that contains the buffer header. Within the context of the present embodiment, the length of a LAN data packet is the total number of bytes associated with the LAN data packet. In the present case, the buffer header is also the packet header of the first LAN data packet. Calculation of the packet length allows for the separation or delineation of the first LAN data packet from any of a plurality of concatenated LAN data packets that possibly may be contained within the memory buffer.

In one embodiment, the LAN hardware driver is able to provide the total number of bytes that are stored in the memory buffer. During normal operation, the total number of bytes stored would be equal in length to the first LAN data packet ready for processing. However, when a memory buffer contains multiple LAN data packets that are concatenated, the total number of bytes stored represents the sum of all the LAN data packets and any extra bytes that are stored in the memory buffer. As such, if the calculated length of the first LAN data packet stored in the memory buffer is not equal to the total number of bytes that are stored in the memory buffer, then the present embodiment can determine that the memory buffer possibly contains multiple and concatenated LAN data packets that would need separating before the memory buffer would be processed.

Referring now to FIG. 5A, an exemplary block diagram illustrates multiple LAN data packets that are concatenated within a single memory buffer 100. The memory buffer 100 contains the first LAN data packet 510 that contains the pre-selected address in packet/buffer header 512. LAN data packet 510 also contains data/CRC 514.

Returning now to flow chart 400, the present embodiment calculates the remaining length of a remaining part of the memory buffer, in step 430. The remaining length can be calculated by subtracting the first packet length of the first LAN data packet from the total length of the memory buffer. In one embodiment, the total length of the memory buffer is 1600 bytes to accommodate for data, headers, CRC error correction, and overhead. In another embodiment, the remaining length can be calculated by subtracting the first packet length of the first LAN data packet from the total number of bytes stored in the memory buffer.

In FIG. 5A, the remaining part 520 of an exemplary memory buffer 100 is shown. The remaining part can possibly contain a plurality of concatenated LAN data packets. In FIG. 5A, the exemplary memory buffer 100 contains two concatenated LAN data packets, 530 and 535 in the plurality of concatenated LAN data packets. It is appreciated that concatenated LAN data packets may or may not immediately follow the first LAN data packet or other concatenated LAN data packets. In addition, any number of LAN data packets may be concatenated. For example, noise data 540 separates LAN data packet 530 from LAN data packet 510. On the other hand, LAN data packet 530 is immediately followed by LAN data packet 535. As a result, memory buffer 100 contains a first LAN data packet 510 and a plurality of concatenated LAN data packets 530 and 535. LAN data packets 530 and 535 follow the format of FIG. 5C and contain packet headers 532 and 537, respectively, and data/CRC 534 and 539, respectively.

In step 440, the present embodiment separates the first data packet from the remaining part of the memory buffer. It is appreciated that numerous means for separating or delineating the first data packet from the remaining part 520 of the memory buffer are available. In one embodiment, flags or pointers are employed to delineate the remaining part 520 from the first data packet 510. The flags or pointers can be used to locate beginning and ending addresses of the remaining part 520 and the first data packet 510. Line 515 of FIG. 5A illustrates the delineation or separation of the first LAN data packet 510 from the remaining part 520 of the memory buffer. In addition, a counter can indicate the presence of multiple LAN data packets that are concatenated within a single memory buffer and are ready for processing.

When the counter reads zero, the memory buffer can be freed to receive incoming LAN data packets. Also, a flag can be set to indicate whether the memory buffer still has concatenated LAN data packets that need processing. In another embodiment, the remaining part 520 of the memory buffer is copied to an available second memory buffer.

In step 450, the present embodiment processes the first LAN data packet 510. The first LAN data packet 510 is processed from its location in the memory buffer (e.g., memory buffer 100).

In decision step 460, the present embodiment determines whether the remaining length is greater than the minimum frame size of 64 bytes, as discussed previously. The remaining length of the remaining part 520 of the memory buffer was previously calculated in step 430. If the remaining length is not greater than the minimum frame size, then no further LAN data packets that are valid can be concatenated within the memory buffer, and the process ends.

However, if the remaining length is greater than the minimum frame size, then it is possible that other LAN data packets could be concatenated within the memory buffer, and the present embodiment proceeds to step 470 to search the remaining part 520 of the memory buffer to locate a plurality of packet headers, each containing the pre-selected address, that are associated with a plurality of concatenated data packets. In general, the remaining part 520 of the memory buffer is incrementally scanned to locate the pre-selected addresses that are associated with the plurality of concatenated LAN data packets until reaching the end of the memory buffer. In one embodiment, it is assumed that a valid pre-selected address marks the beginning of a valid LAN data packet. If a pre-selected address is not found, then the process ends.

In step 480, the present embodiment calculates a plurality of concatenated packet lengths that are associated with the plurality of concatenated data packets. Determining the packet lengths of each of the plurality of concatenated LAN data packets is necessary to identify the correct memory location and length of bytes necessary to process the associated LAN data packet.

In step 490, the present embodiment separates the plurality of concatenated data packets that are associated with the plurality of concatenated packet lengths for processing. As discussed previously, it is appreciated that numerous means for separating or delineating the plurality of concatenated LAN data packets are available. In one embodiment, flags or pointers are employed to delineate the plurality of concatenated LAN data packets. The flags or pointers can be used to locate beginning and ending addresses of each of the plurality of concatenated LAN data packets. In another embodiment, each of the plurality of concatenated LAN data packets is copied to an available memory buffer for independent processing.

Figure 6:
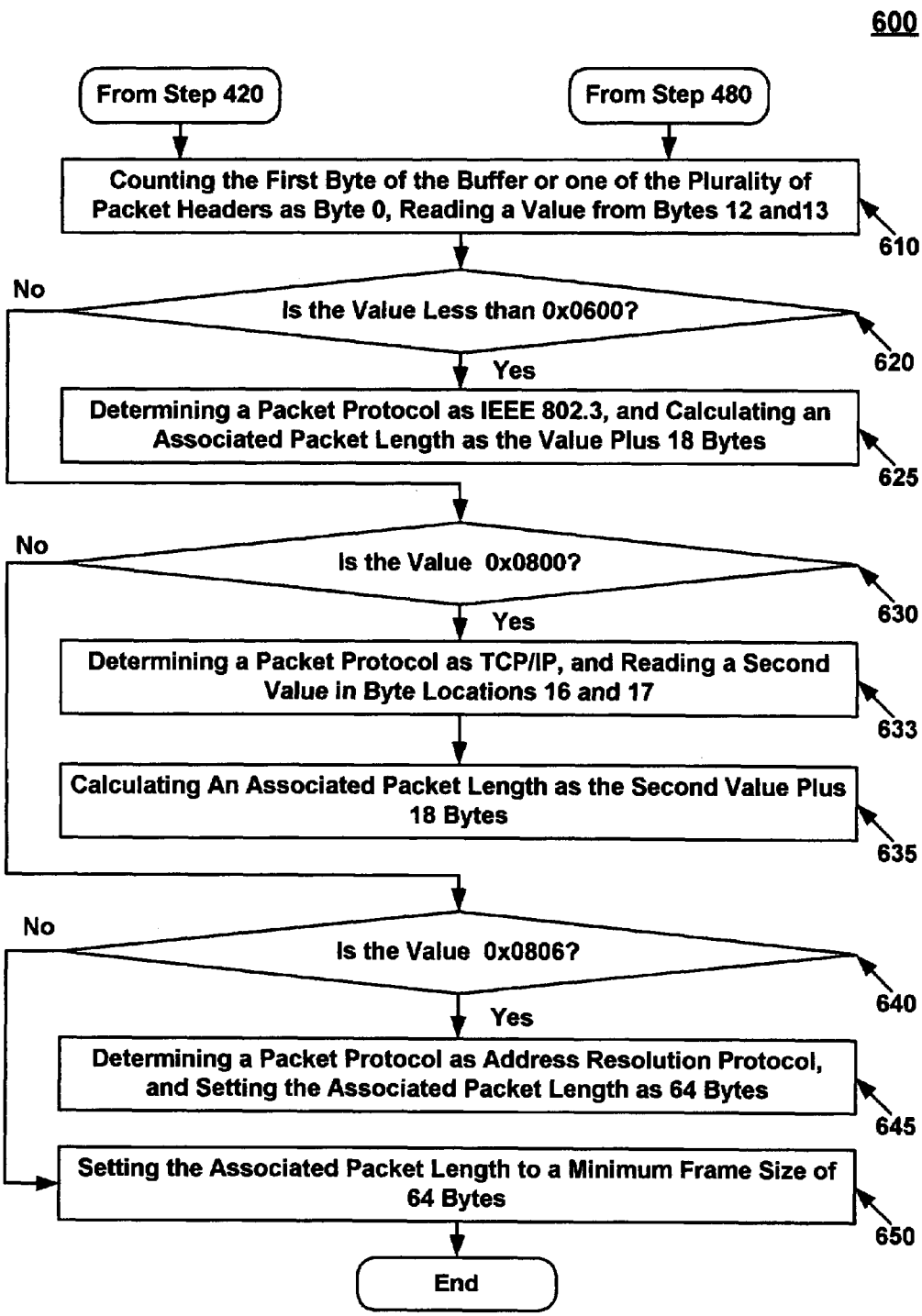
FIG. 6 is a flow diagram illustrating steps in a method of determining a packet length of a LAN data packet contained within a memory buffer, in accordance with one embodiment of the present invention.

FIG. 6 is a flow chart 600 illustrating steps in a method for calculating the length of a LAN data packet contained within a memory buffer, in accordance with one embodiment of the present invention. Flow chart 600 is implemented from steps 420 and 480 in order to calculate the length of the first LAN data packet or the lengths of the concatenated LAN data packets.

Flow chart 600 essentially determines the protocol of the LAN data packet in order to calculate the packet length of the LAN data packet. In one embodiment, separation of concatenated LAN data packets occurs within a text based environment, such as, Transmission Control Protocol/Internet Protocol (TCP/IP), or the Telnet protocol. As such, for efficiency, flow chart 600 focuses on only three types of protocols: the IEEE 802.3 Ethernet protocol, the Internet TCP/IP protocol, and the Address Resolution Protocol (ARP) used for determining the hardware address of a node on a LAN.

In step 610 of flow chart 600, counting the first byte of the packet header or the memory buffer header as byte 0, the present embodiment reads a value from bytes 12 and 13 in order to determine the protocol of the packet. As shown in FIG. 5C, bytes 12 and 13 comprise the 2-byte type field 6. Once the protocol is determined, the present embodiment can locate the bytes in the associated LAN data packet that represent the total length of the LAN data packet for processing.

In decision step 620, the present embodiment determines whether the value is less than hexadecimal 0x0600. If the value is less than 0x0600, then the present embodiment assumes that the protocol of the associated LAN data packet is the IEEE 802.3 Ethernet protocol, in step 625. In that case, the IEEE 802.3 Ethernet protocol stores the length of the LAN data packet in bytes 12 and 13. As such, the present embodiment can calculate an associated packet length as the value determined from bytes 12 and 13 plus 18 bytes. The additional 18 bytes are to account for the initial header and the 4 bytes for the CRC final packet checksum. This length is used as the length of the data packet for processing.

On the other hand, if the value in bytes 12 and 13 is not less than 0x0600, the present embodiment proceeds to decision step 630 to determine if the value in bytes 12 and 13 is equal to hexadecimal 0x0800.

If the value in bytes 12 and 13 is 0x0800, then the present embodiment determines the protocol of the associated LAN data packet as the Internet TCP/IP protocol, in step 633. In that case, the TCP/IP protocol stores the length of the associated LAN data packet in bytes 16 and 17. As such, the present embodiment reads a second value from bytes 16 and 17.

In step 635, the present embodiment calculates an associated packet length as the second value determined from bytes 16 and 17 plus 18 bytes. The additional 18 bytes are to account for the initial header and the 4 bytes for the CRC final packet checksum. This length is used as the length of the LAN data packet for processing.

On the other hand, if the value in bytes 12 and 13 is not 0x0800, the present embodiment proceeds to decision step 640 to determine if the value in bytes 12 and 13 is equal to hexadecimal 0x0806.

If the value in bytes 12 and 13 is 0x0806, then the present embodiment determines the protocol of the associated LAN data packet as the ARP protocol, in step 645. In that case, the ARP protocol standardizes its packet length to 64 bytes. As such, the packet length of the associated LAN data packet is 64 bytes. This length is used as the length of the LAN data packet for processing.

On the other hand, if the value in bytes 12 and 13 is not 0x0806, the present embodiment proceeds to step 650 and sets the packet length of the associated LAN data packet to a minimum frame size of 64 bytes. This length is used as the length of the LAN data packet for processing. In another embodiment, it is appreciated that step 640 can be combined into step 650, and wherein the packet length is set to the minimum frame size of 64 bytes.

Figure 7:
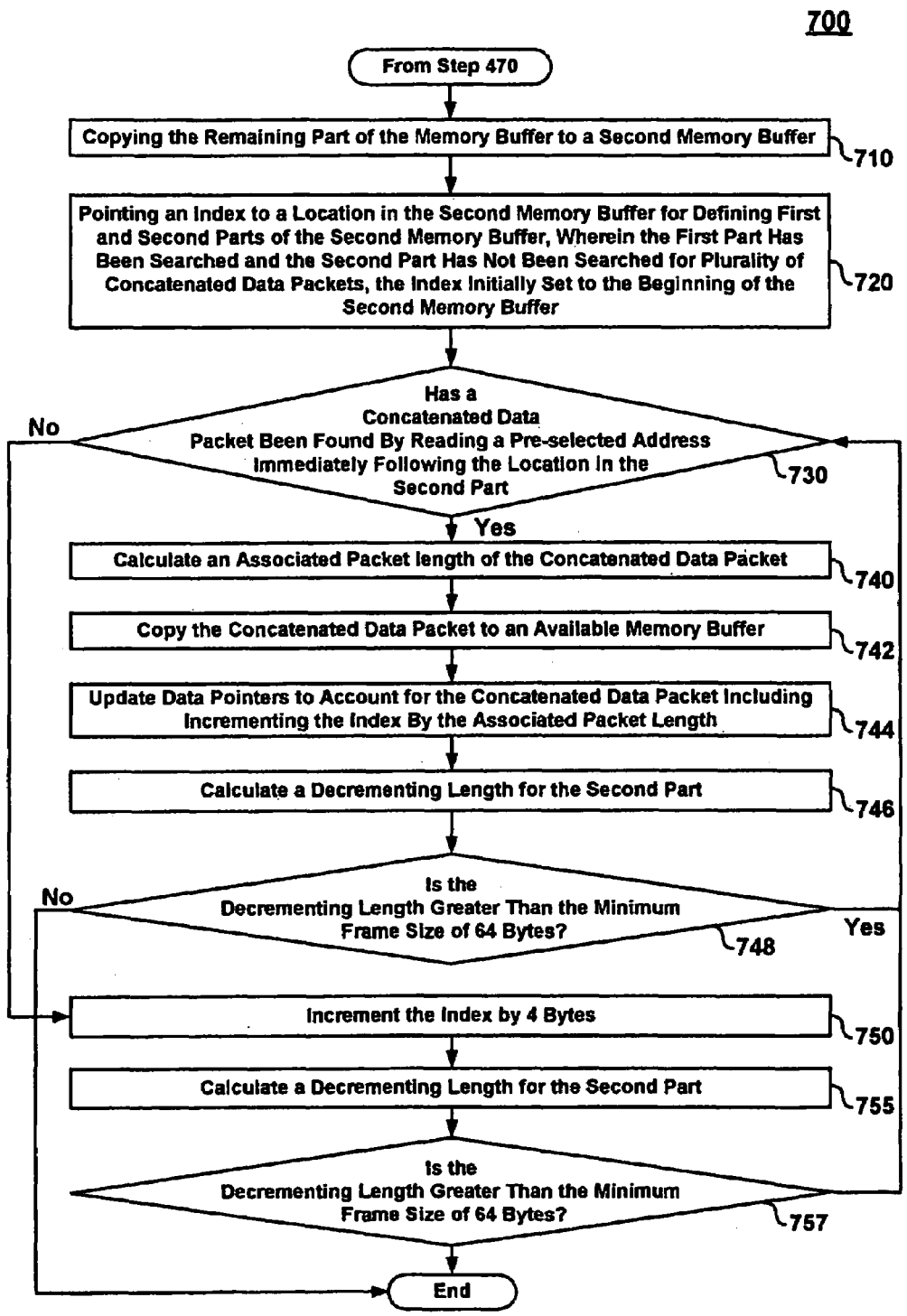
FIG. 7 is a flow diagram illustrating steps in a method of searching through a memory buffer for concatenated LAN data packets, in accordance with one embodiment of the present invention.

FIG. 7 in combination with FIG. 5B illustrate the method of searching through the memory buffer in order to locate other concatenated LAN data packets. FIG. 7 is a flow chart 700 illustrating steps in a method for incrementally searching through the remaining part 520 of the memory buffer 100, in accordance with one embodiment of the present invention. Flow chart 700 is implemented from step 470 in order to search the remaining part 520 of the buffer memory 100 in order to locate the plurality of packet headers associated with the plurality of concatenated LAN data packets.

In step 710, the present embodiment copies the remaining part 520 of the memory buffer 100 to a second memory buffer. Other embodiments are well suited to separating or delineating the remaining part 520 within the memory buffer 100 itself In step 720, the present embodiment points an index to a location in the second memory buffer for defining first and second parts of the second memory buffer. The first part of the second memory buffer has been searched for the plurality of concatenated LAN data packets. The second part of the second memory buffer has not been searched for the plurality of concatenated LAN data packets. The index is initially set to the beginning, or a beginning address, of the second memory buffer.

FIG. 5B is a block diagram of the remaining part 520 of the memory buffer 100 at an exemplary state within the searching process of flow chart 700. Line 555 illustrates the location of the index within the remaining part 520. To the left of the line 555, the first part 550 of the second memory buffer is shown. In FIG. 5B, the first part 550 did not contain any concatenated LAN data packets. To the right of the line 555, the second part 560 of the second memory buffer is shown. The second part 560 has not been searched for concatenated LAN data packets. Subsequent searching as implemented in flow chart 700 will discover the presence of two concatenated LAN data packets 530 and 535.

Returning back to FIG. 7, the present embodiment determines if a concatenated data packet has been located by reading the 6 bytes immediately following the location as indicated by the index. In one embodiment, the index points to an address that is the first byte within the 6 bytes that are read. If the 6 bytes indicates one of the pre-selected destination addresses, a MAC broadcast address or the MAC address of the hardware driver, then a packet header and its corresponding concatenated LAN data packet has been located, and the present embodiment proceeds to step 740.

In step 740, the present embodiment calculates the associated packet length of the concatenated LAN data packet. The method implemented in flow chart 600 is suitable for determining the associated packet length of the concatenated LAN data packet.

In step 742, the present embodiment copies the concatenated LAN data packet to an available memory buffer for independent processing.

In step 744, the present embodiment updates the data pointer to account for the concatenated LAN data packet. For example, the index is incremented by the associated packet length, determined from step 740, of the concatenated LAN data packet.

In step 746, the present embodiment also calculates a decrementing length of the second part 560 of the remaining part 520 of the memory buffer 100. This is to determine preliminarily if the second part 560 contains any concatenated LAN data packets. In one embodiment, the decrementing length is initially set as the length of the remaining part 520. Thereafter, in step 746, the decrementing length is updated by decrementing the decrementing length by the associated length of the concatenated LAN data packet.

In decision step 748, the present embodiment determines if the decrementing length of the second part 560 is greater than the minimum frame size of 64 bytes. If the decrementing length is greater than 64 bytes, then there is a possibility of the presence of other concatenated LAN data packets within the remaining part 520 of the memory buffer 100. As such, the present embodiment returns to step 730 to continue searching for any possible concatenated LAN data packets.

On the other hand, if the present embodiment determines that the decrementing length of the second part 560 is less than the minimum frame size of 64 bytes, then there are no further concatenated LAN data packets within the second part 560 and the present embodiment ends.

Returning to step 730, if the present embodiment determines that a concatenated LAN data packet has not been located, then the present embodiment proceeds to step 750 and increments the index by 4 bytes. Noise data is stored 4 bytes at a time. As such, the present embodiment searches the second part 560 of the remaining part 520 of the memory buffer 100 in 4 byte intervals until locating a concatenated LAN data packet.

In step 755, the present embodiment also calculates a decrementing length of the second part 560 of the remaining part 520 of the memory buffer 100. This is to determine preliminarily if the second part 560 contains any concatenated LAN data packets. In one embodiment, the decrementing length is initially set as the length of the remaining part 520. Thereafter, in step 755, the decrementing length is updated by decrementing the decrementing length by 4 bytes.

In decision step 757, the present embodiment determines if the decrementing length of the second part 560 is greater than the minimum frame size of 64 bytes. If the decrementing length is greater than 64 bytes, then there is a possibility of the presence of other concatenated LAN data packets within the remaining part 520 of the memory buffer 100. As such, the present embodiment returns to step 730 to continue searching for any possible concatenated LAN data packets.

On the other hand, if the present embodiment determines that the decrementing length of the second part 560 is less than the minimum frame size of 64 bytes, then there are no further concatenated LAN data packets within the second part 560 and the present embodiment ends.

While the methods of embodiments illustrated in flow charts 400, 600, and 700 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

A method and apparatus for separating concatenated LAN data packets contained within a single memory buffer, is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A method of separating packets comprising:
   a) locating a memory buffer containing a pre-selected address at a buffer header of said memory buffer;
   b) separating a first data packet containing said buffer header, that is associated with a first packet length from a remaining part of said memory buffer, wherein said separating said first data packet further comprises calculating said first packet length, wherein said calculating said first packet length comprises:
   counting a first byte in said buffer head as byte 0, reading a value from byte 12 and 13 in said buffer header;
   calculating said packet length as said value plus 18 bytes when said value is less than 0x0600;
   calculating said packet length as a second value found in byte locations 16 and 17 in said header plus 18 bytes when said value is 0x0800;
   setting said packet length as 64 bytes when said value is 0x0806; and
   otherwise setting said packet length as 64 bytes;
c) searching said remaining part of said memory buffer to locate a plurality of packet headers, each containing said pre-selected address, associated with a plurality of concatenated data packets; and
d) separating said plurality of concatenated data packets, that is associated with a plurality of concatenated packet lengths, for processing, wherein said plurality of concatenated packet lengths are not required to be the same and are determined based on positions of said pre-selected address in said plurality of concatenated data packets.

2. The method of separating packets as described in claim 1, wherein said pre-selected address is a Media Access Control (MAC) broadcast address of FF-FF-FF-FF-FF-FF in hexadecimal.

3. The method of separating packets as described in claim 1, wherein a) comprises:
receiving said first data packet from a local area network (LAN) at a LAN hardware driver, and wherein said pre-selected address is an Media Access Control (MAC) address of said LAN hardware driver.

4. The method of separating packets as described in claim 1, further comprising:
processing said first data packet from said memory buffer.

5. The method of separating packets as described in claim 1, wherein d) further comprises:
calculating said plurality of concatenated packet lengths, wherein said calculating a concatenated packet length of a second concatenated data packet comprises:
   counting a third byte in a packet header associated with said second concatenated data packet as byte 0, reading a third value from byte locations 12 and 13 in said packet header;
   calculating said concatenated packet length as said third value plus 18 bytes when said value is less than 0x0600;
   calculating said concatenated packet length as a fourth value found in byte locations 16 and 17 in said header plus 18 bytes when said third value is 0x0800;
   setting said concatenated packet length as 64 bytes when said third value is 0x0806; and
   otherwise setting said concatenated packet length as 64 bytes.

6. The method of separating packets as described in claim 1, wherein d) further comprises:
copying said plurality of concatenated data packets into a plurality of available buffer memories; and
processing said plurality of concatenated data packets.

7. The method of separating packets as described in claim 1, wherein b) further comprises:
copying said remaining part of said memory buffer to a second memory buffer.

8. The method of separating packets as described in claim 7, wherein c) further comprises:
c1) pointing an index to a location in said second memory buffer, said location defining a first and second part of said second memory buffer, wherein said first part has been searched for said plurality of concatenated data packets and said second part has not been searched for said plurality of concatenated data packets, said index initially set to a beginning location of said second memory buffer;
c2) checking for said pre-selected address at said location;
c3) incrementing said index by 4 bytes if said pre-selected address was not found; and
c4) calculating a decrementing length for said second part, and returning to step c1) as long as said second part is greater than a minimum frame size.

9. The method of separating packets as described in claim 1, wherein d) comprises:
d1) setting a plurality of pointers for said separating said first data packet and said separating said plurality of concatenated data packets; and
d2) selling a flag for indicating when said memory buffer has data packets ready for processing.

10. A method of separating packets comprising:
a) locating a memory buffer containing a pre-selected address at a header of said memory buffer, said memory buffer possibly containing a plurality of concatenated data packets each containing said pre-selected address;
b) calculating a first packet length of a first concatenated data packet containing said pre-selected address in said header;
c) separating said first concatenated data packet from a remaining part of said memory buffer;
d) searching said remaining part of said memory buffer to locate said plurality of concatenated data packets each containing said pre-selected address;
e) calculating a plurality of packet lengths, including said first packet length, to determine said plurality of concatenated data packets, wherein said plurality of packet lengths are not required to be the same and are determined based on positions of said pre-selected address in said plurality of concatenated data packets, wherein said calculating said plurality of packet lengths further comprises:
   reading a value from byte locations 12 and 13 in one of said plurality of concatenated data packets;
   calculating an associated packet length as said value Plus 18 bytes when said value is less than 0x0600;
   calculating said associated packet length as a second value found in byte locations 16 and 17 plus 18 bytes when said value is 0x0800;
   otherwise setting said packet length as 64 bytes; and
f) copying said plurality of concatenated data packets into a plurality of available buffer memories for processing.

11. The method of separating packets as described in claim 10, further comprising:
processing said first concatenated data packet from said first memory buffer.

12. The method of separating packets as described in claim 10, further comprising:
processing said plurality of concatenated data packets.

13. The method of separating packets as described in claim 10, wherein said pre-selected address is a Media Access Control (MAC) broadcast address of FF-FF-FF-FF-FF-FF in hexadecimal.

14. The method of separating packets as described in claim 10, wherein a) comprises:
receiving said plurality of concatenated data packets from a local area network (LAN) at a LAN hardware driver, and wherein said pre-selected address is a Media Access Control (MAC) address of said LAN hardware driver.

15. The method of separating packets as described in claim 10, wherein c) further comprises:
copying said remaining part of said buffer to a second buffer.

16. The method of separating packets as described in claim 15, wherein d) further comprises:
d1) incrementally checking for said pre-selected address in said second buffer until locating said pre-selected address that is contained within a second concatenated data packet.
d2) calculating a second packet length of said secohd concatenated data packet;
d3) copying said second concatenated data packet to a third memory buffer for said processing;
d4) incrementally checking for said pre-selected address in said second buffer until locating said pre-selected address that is contained within a third concatenated data packet;
d5) calculating a third packet length of said third concatenated data packet; and
d6) copying said third concatenated data packet to a fourth memory buffer for said processing.

17. The method of separating packets as described in claim 15, wherein d) further comprises:
d1) pointing an index to a location of said second buffer, said location defining a first and second part of said second buffer, wherein said first part has been searched for said plurality of concatenated data packets and said second part has not been searched for said plurality of concatenated data packets, said index initially set to a beginning location of aid second buffer;
d2) checking for said pre-selected address at said location;
d3) incrementing said index by 4 bytes if said pre-selected address was not found; and
d4) calculating a length for said second part, and returning to step d1) as long as said second part is greater than a minimum frame size.

18. The method of separating packets as described in claim 17, wherein d) further comprises:
d5) calculating a length of an associated concatenated data packet as described in step e); and
d6) incrementing said index by said length and returning to step d1).

19. The method of separating packets as described in claim 10, wherein said pre-selected address is a destination address.

20. A computer system comprising:
a processor; and
a computer readable memory coupled to said processor and containing program instructions that, when executed, implement a method of separating packets comprising:
a) locating a memory buffer containing a pre-selected address at a buffer header of said memory buffer;
b) separating a first data packet containing said buffer header, that is associated with a first packet length, from a remaining part of said memory buffer, wherein said separating said first data packet further comprises calculating said first packet length, wherein said calculating said first packet further comprises:
counting a first byte in said buffer head as byte 0, reading a value from bytes 12 and 13 in said buffer header;
calculating said packet length as said value plus 18 bytes when said value is less than 0x0600;
calculating said packet length as a second value found in byte locations 16 and 17 in said header plus 18 bytes when said value is 0x0800;
setting said packet length as 64 bytes when said value is 0x0806; and otherwise setting said packet length as 64 bytes;
c) searching said remaining part of said memory buffer to locate a plurality of packet headers, each containing said pre-selected address, associated with a plurality of concatenated data packets; and
d) separating said plurality of concatenated data packets, that is associated with a plurality of concatenated packet lengths, for processing, wherein said plurality of concatenated packet lengths are not required to be the same and are determined based on positions of said pre-selected address in said plurality of concatenated data packets.

21. The computer system as described in claim 20, wherein said pre-selected address is a Media Access Control (MAC) broadcast address of FF-FF-FF-FF-FF-FF is hexadecimal.

22. The computer system as described in claim 20, wherein a) in said memory comprises:
receiving said first data packet from a local area network (LAN) at a LAN hardware driver, and wherein said pre-selected address is an Media Access Control (MAC) address of said LAN hardware driver.

23. The computer system as described in claim 20, wherein said method further comprises:
processing said first data packet from said memory buffer.

24. The computer system as described in claim 20, wherein d) in said method further comprises:
calculating said plurality of concatenated packet lengths, wherein said calculating a concatenated packet length of a second concatenated data packet comprises:
counting a third byte in a packet header associated with said second concatenated data packet as byte 0, reading a third value from byte locations 12 and 13 in said packet header;
calculating said concatenated packet length as said third value plus 18 bytes when said value is less than 0x0600;
calculating said concatenated packet length as a fourth value found in byte locations 16 and 17 in said header plus 18 bytes when said third value is 0x0800;
setting said concatenated packet length as 64 bytes when said third value is 0x0806; and
otherwise setting staid concatenated packet length as 64 bytes.

25. The computer system as described in claim 20, wherein d) in said method further comprises:
copying said plurality of concatenated data packets into a plurality of available buffer memories; and
processing said plurality of concatenated data packets.

26. The computer system as described in claim 20, wherein b) in said memory further comprises:
copying said remaining part of said memory buffer to a second memory buffer.

27. The computer system as described in claim 26, wherein c) in said memory further comprises:

c1) pointing an index to a location in said second memory buffer, said locating defining a first and second part of said second memory buffer, wherein said first part has been searched for said plurality of concatenated data packets and said second part has not been searched for said plurality of concatenated data packets, said index initially set to a beginning location of said second memory buffer;

c2) checking for said pre-selected address at said location;

c3) incrementing said index by 4 bytes if said pre-selected address was not found; and c4) calculating a decrementing length for said second part, and returning to step c1) as long as said second part is greater than a minimum frame size.

28. The computer system as described in claim 20, wherein d) in said method comprises:

d1) setting a plurality of pointers for said separating said first data packet and said separating said plurality of concatenated data packets; and d2) setting a flag for indicating when said memory buffer has data packets ready for processing.

* * * * *

UNITED STATES PATENT AND TRADEMARK OFFICE
CERTIFICATE OF CORRECTION

PATENT NO. : 7,333,498 B2
APPLICATION NO. : 10/147004
DATED : February 19, 2008
INVENTOR(S) : Kenneth C. Duisenberg et al.

It is certified that error appears in the above-identified patent and that said Letters Patent is hereby corrected as shown below:

In column 3, line 7, after "embodiment of" delete "he" and insert -- the --, therefor.

In column 3, line 10, after "embodiment of" delete "he" and insert -- the --, therefor.

In column 8, line 9, after "field" delete "6" and insert -- 586 --, therefor.

In column 12, line 24, in Claim 9, delete "selling" and insert -- setting --, therefor.

In column 12, line 50, in Claim 10, delete "Plus" and insert -- plus --, therefor.

In column 13, line 17, in Claim 16, after "packet" delete "." and insert -- ; --, therefor.

In column 13, line 18, in Claim 16, after "of said" delete "secohd" and insert -- second --, therefor.

In column 13, line 38, in Claim 17, after "location of" delete "aid" and insert -- said --, therefor.

In column 14, line 55, in Claim 24, delete "staid" and insert -- said --, therefor.

In column 15, line 2, in Claim 27, delete "locating" and insert -- location --, therefor.

Signed and Sealed this

Tenth Day of June, 2008

JON W. DUDAS
*Director of the United States Patent and Trademark Office*